Dec. 1, 1953     R. C. DAVIS ET AL     2,660,759
METHOD OF MAKING GROMMETS
Filed June 9, 1949
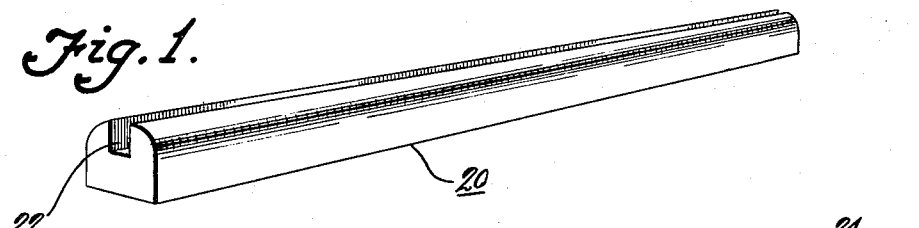
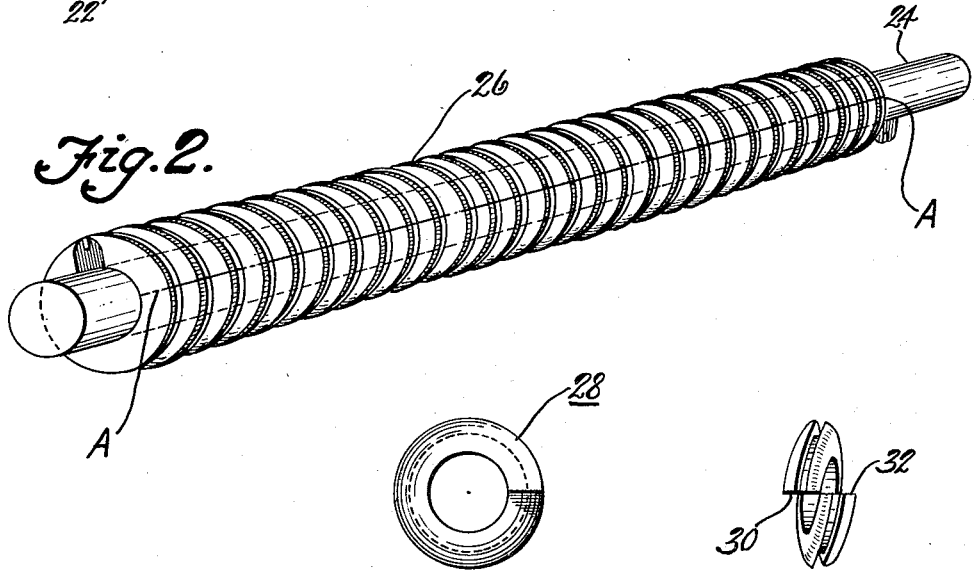
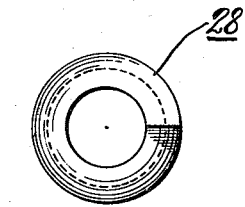
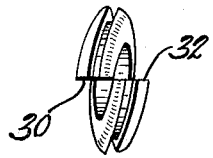
INVENTORS
RAYMOND C. DAVIS &
JOHN T. MARVIN
By Spencer Hardman & Fiher
their ATTORNEYS Patented Dec. 1, 1953

2,660,759

UNITED STATES PATENT OFFICE 2,660,759

METHOD OF MAKING GROMMETS

Raymond C. Davis and John T. Marvin, Dayton, Ohio, assignors to General Motors Corporation, Detroit, Mich., a corporation of Delaware Application June 9, 1949, Serial No. 98,036

1 Claim. (Cl. 18—47.5)

This invention relates to grommets and is particularly concerned with resilient grommets and the method of making same.

The prime object of the invention is to provide a grommet made from extruded stock and a method for making same.

In carrying out the above object, it is a further object of the invention to extrude long lengths of rubber-like material into the desired cross section, wind a long length of said material upon a mandrel of the desired diameter, cure the rubber-like material upon the mandrel and then slit the material longitudinally of the mandrel to provide a plurality of split grommets having an offset between the ends thereof equal to the helix angle of the wound extruded stock.

Another object of the invention is to provide a rubber-like grommet of generally annular shape which is split and which has a spiral form wherein the ends thereof are not in alignment with one another.

Further objects and advantages of the present invention will be apparent from the following description, reference being had to the accompanying drawing, wherein a preferred embodiment of the present invention is clearly shown.

In the drawing:

Fig. 1 shows a length of extruded stock having the desired cross section.

Fig. 2 shows the extruded stock wound upon a mandrel for curing purposes.

Fig. 3 is a top view of a finished grommet.

Fig. 4 is a side view of a grommet.

Grommets are used in many applications wherein wires, rods, tubes or the like are passed through wall sections wherein the grommet acts as an insulator both for electrical purposes and for sound deadening effects. Grommets of this type are used considerably in the automotive industry wherein said grommets are utilized in apertures, for example, in the fire wall of the automobile as a means for insulating wiring, steering columns, choke wires and the like from the fire wall wherein vibration is minimized and the sound thereof is deadened and wherein wires are electrically insulated from the fire wall and simultaneously are kept from being cut by the sharp metal of the wall. These grommets are of generally annular shape having an annular groove around the outside thereof and an aperture through the middle equal to, or slightly less than, the diameter of the part to be passed therethrough.

Grommets have in the past been made from molded material wherein an annular shape is molded and is then cut so that it may be passed over the wire or other part to be protected, whereupon the grommet is slipped up to the wall and pressed into place so that the wall actually rests within the outer grooved portion.

It is apparent that molding grommets is an expensive procedure and the present invention is directed to a means for reducing the cost of these grommets and simultaneously making an improved grommet which is easier to install.

It is to be understood that in the description and claim to follow resilient rubber-like material includes all of the usual materials which are vulcanizable. For example, compounded rubber, compounded reclaimed rubber, compounded butadiene-styrene copolymers, compounded butadiene-acrylonitrile copolymers, compounded polychloroprene and in fact any of the natural rubbers or synthetic materials or mixtures thereof which are vulcanizable to form a suitable article having a degree of resiliency. Also plastics such as vinyl resins and the like may be used if desired. Referring particularly to the drawings, the grommets, as made under the teachings of the present invention, are extruded in longitudinal lengths as shown at 20 from compounded rubber-like stock wherein the cross section of the extruded part includes a longitudinal groove 22 therein. This extrusion may be carried out in a convetnional tuber wherein lengths of any desired extent may be formed. After the uncured rubber-like material is extruded in the desired cross section, it is wound spirally upon a metal mandrel 24. The mandrel 24 has a diameter equal to, or slightly less than, the desired inner diameter of the finished grommet. The uncured rubber-like material is easily wound to shape upon the mandrel to form an elongated spiral 26 as shown in Fig. 2. In this spiral, each adjacent coil of the extruded stock 20 is in contact with the coils on either side thereof. The mandrel, which may be of any length compatible with the curing retorts used, with the uncured rubber-like material wound thereon is then placed in a suitable retort and the rubber-like material is cured or vulcanized in the conventional manner, under suitable conditions of time and temperature, for the particular stock being operated upon. After curing, the mandrel 24 with the spiral coil 26 of stock 20 thereon is removed from the retort and cooled and the cured stock 20 is then slit along the line A—A shown in Fig. 2. This permits removal of the entire spiral in a single tubular-like piece since adjacent coils of the stock 20, being in contact with one another, superficially bond together. This longitudinal tubular piece may then be used as a grommet assembly wherein individual grommets, as shown at 28, may be easily peeled off from the remainder of the core. The grommets 28 have a cured shape wherein the grommet is of a spiral nature having the two ends thereof offset as shown in Fig. 4. The ends 30 and 32, respectively, are offset the width of the stock 20, or as stated differently, are on the helix angle of the coil or spiral 26. This cured shape of the grommet 28 makes it particularly desirable for installation since the grommet is already offset on the ends thereof and may be easily slipped over wires, rods, tubes and the like whereupon the grommet may be inserted within the wall or other portion of sheet metal, wood, or other material in which it is to be used by entering the closest end thereof so that the start of the groove receives the wall and then progressively following up with the remainder of the grommet until it is in place.

The superficial bonding of adjacent grommets into a tubular form is also a highly useful production feature. In this manner a production operator does not have to handle hundreds of small, loose grommets, but rather handles a split tube from which individual grommets may be readily peeled off as they are used.

Specific examples of vulcanizable rubber-like stock, which makes satisfactory grommets, are listed here below. It is to be understood that these examples are in no way limiting but are given for illustrative purposes only. The specific ingredients therein may be varied within the wide limits to obtain physical characteristics and curing conditions, all of which are well known in the art.

Example #1

| | |
|---|---|
| Crude rubber | 42.60 |
| Accelerator, Altax | .50 |
| Carbon black | 25.20 |
| Clay | 25.20 |
| Zinc oxide | 3.50 |
| Sulfur | .80 |
| Stearic acid | 1.00 |
| Paraffin | 1.00 |
| Anti-oxidant PBNA | .20 |
| | 100.00 |

Cure in open steam for 25 minutes at 50 pounds per square inch.

Example #2

| | |
|---|---|
| Butadiene-styrene copolymer | 59.10 |
| Accelerator, Captax | .90 |
| Zinc oxide | 3.00 |
| Anti-oxidant PBNA | .30 |
| Carbon black | 29.00 |
| Coal tar | 6.50 |
| Sulfur | 1.20 |
| | 100.00 |

Cure in open steam for 30 minutes at 60 pounds per square inch.

Example #3

| | |
|---|---|
| Butadiene-acrylonitrile copolymer | 47.40 |
| Zinc oxide | 4.80 |
| Stearic acid | .20 |
| Accelerator, Altax | 1.40 |
| Accelerator, Tuads | 1.40 |
| Sulfur | .20 |
| Paraplex G-25 | 7.00 |
| Carbon black | 37.60 |
| | 100.00 |

Cure in open steam for 30 minutes at 70 pounds per square inch.

Example #4

| | |
|---|---|
| Polychloroprene | 63.40 |
| Stearic acid | 1.40 |
| Magnesium oxide | 2.40 |
| Zinc oxide | 3.20 |
| Sulfur | .60 |
| Mineral oil | 6.20 |
| Anti-oxidant PBNA | .60 |
| Carbon black | 22.20 |
| | 100.00 |

Cure in open steam for 30 minutes at 70 pounds per square inch.

Example #5

| | |
|---|---|
| Whole tire reclaim | 67.50 |
| Accelerator | .60 |
| Anti-oxidant PBNA | .20 |
| Reogen | 1.00 |
| Zinc oxide | 2.50 |
| Carbon black | 24.30 |
| Paraffin | 3.00 |
| Stearic acid | .50 |
| Sulfur | .40 |
| | 100.00 |

Cure in open steam for 30 minutes at 50 pounds per square inch.

Plastics, such as vinyl derivatives, may also be used as are well known in the extruding art.

From the foregoing it will be apparent that we have provided a new and improved grommet which is made by a novel method that produces improved production techniques. Similarly, the grommet as manufactured by the method is easier to use, is much less expensive and is equally satisfactory to any grommets heretofore manufactured.

While the embodiment of the present invention as herein disclosed, constitutes a preferred form, it is to be understood that other forms might be adopted.

What is claimed is as follows:

In a method of making a resilient, rubber-like grommet, the steps of: extruding vulcanizable, rubber-like material into the desired cross sectional shape, winding the extruded material upon a mandrel of the desired diameter so that each adjacent turn of the extruded material is in contact with the next turn thereof, curing the extruded stock upon the mandrel for vulcanizing the same into a resilient tubular structure and simultaneously superficially bonding together adjacent contacting turns of said helix, slitting the cylindrical structure longitudinally of the mandrel, removing the stock from the mandrel in a split tubular form, and finally peeling off a single grommet from the tube adjacent the contacting portion of the next adjacent grommet by breaking said superficial bond.

RAYMOND C. DAVIS.
JOHN T. MARVIN.

References Cited in the file of this patent

UNITED STATES PATENTS

| Number | Name | Date |
|---|---|---|
| 126,953 | Harris | May 21, 1872 |
| 251,258 | Lockwood | Dec. 20, 1881 |
| 1,900,298 | Morris | Mar. 7, 1933 |
| 2,188,596 | Hobert | Jan. 30, 1940 |
| 2,225,472 | Franklin | Dec. 17, 1940 |
| 2,291,430 | Ingersoll | July 28, 1942 |
| 2,315,366 | Daley | Mar. 30, 1943 |
| 2,355,126 | Webster et al. | Aug. 8, 1944 |
| 2,518,851 | Anderson | Aug. 15, 1950 |